United States Patent [19]

Snyder

[11] Patent Number: 5,270,792
[45] Date of Patent: Dec. 14, 1993

[54] DYNAMIC LATERAL SHEARING INTERFEROMETER

[75] Inventor: James J. Snyder, San Jose, Calif.
[73] Assignee: Blue Sky Research, Inc., San Jose, Calif.
[21] Appl. No.: 657,289
[22] Filed: Feb. 19, 1991

Related U.S. Application Data

[63] Continuation-in-part of Ser. No. 502,119, Mar. 28, 1990, abandoned.

[51] Int. Cl.$^5$ ............................................. G01B 9/02
[52] U.S. Cl. ..................................................... 356/353
[58] Field of Search ............... 356/353, 354, 356, 359, 356/363, 345

[56] References Cited

U.S. PATENT DOCUMENTS 4,786,175 11/1988 Duffus ................................. 356/353

FOREIGN PATENT DOCUMENTS 0050709 3/1988 Japan ................................... 356/353

Primary Examiner—Samuel A. Turner

[57] ABSTRACT

A parallel plate lateral shearing interferometer allows the shearing plate to oscillate through a small angle periodically causing the interference fringe pattern to translate on a display surface providing an indication of the direction of adjustment required to collimate a beam. At the point of exact collimation the interference pattern changes abrubtly to a blinking pattern of dark and light. In one embodiment the shearing plate is oscillated by a new kind of electronic translator that functions by thermal expansion and contraction, and in another embodiment the shearing plate moves as a pendulum. An alternative embodiment of the translator is also provided for non-oscillatory precision translations.

15 Claims, 14 Drawing Sheets

Fringe Pattern

DYNAMIC LATERAL SHEARING INTERFEROMETER

This application is a continuation-in-part of U.S. application Ser. No. 07/502,119 which is now abandoned.

FIELD OF THE INVENTION

The present invention pertains to apparatus for optical experiments and measurements and is particularly related to apparatus and methods for determining collimation of laser light, and to drive systems for such apparatus.

BACKGROUND OF THE INVENTION

Interferometry is an art long used in optics to study light. The electromagnetic waves that make up a beam of light are commonly examined by directing the beam onto an object or surface and visually examining or photographically recording the patterns of reflected and scattered light from the object or surface. A beam of light from a sealed beam headlamp might, for example, be directed onto a screen, and the pattern of the illuminated area will reveal information about the filament, filament placement, and the quality of the parabolic reflector to one skilled in the art.

The wave nature of light has long been known, and it has long been known that light waves directed to the same position in space will "interfere". The principles of interference are simple: if two waves are directed toward the same point so that they overlap, the amplitude of the resulting wave at any instant will be the algebraic sum of the amplitudes of the two separate waves. Hence, if the two waves at an instant have the same absolute amplitude but one is positive and the other negative, the amplitudes will cancel, i.e. interfere, and there will be no light at that point at that instant. If the two waves are both positive or both negative in amplitude, the amplitudes will add, and the light intensity will be greater than for either wave alone. If the two waves considered have the same wavelength the result will be a standing wave.

A coherent beam of light, such as light produced by a laser, is light wherein all the waves have the same wavelength and their relative phases are stationary in time. Most naturally occurring and man-made light sources are not coherent, and interferometry is not very useful for characterizing substantially non-coherent beams, because little can be learned from the random interference patterns produced by such beams.

Coherent light is very desirable for many purposes in optics. For example, if one produces a lens for a telescope, and then uses the lens to focus a known coherent beam of light, one might qualify the lens by the aberrations caused to the beam by the lens as determined by viewing an interference pattern. Coherent light in an optics laboratory is very useful for many kinds of experiments and tests.

Another optical beam quality that is highly desirable for optical testing is collimation. A beam is said to be collimated when all rays or wave vectors of the light are exactly parallel. For light propagating in an isotropic medium, such as space or the atmosphere, the direction of propagation of the energy carried by the field, and therefore the wave vector of the field, is normal to the surface of constant optical phase (called the wavefront surface). Parallel wave vectors thus mean that the wavefront is flat and that the light is propagating in the form of a plane wave.

Light which is collimated as well as coherent is particularly useful in testing lenses, mirrors, and other optical elements. Another use of a collimated beam includes aligning and focusing optical systems such as telescopes. Also, collimated beams are produced for sending light over long distances, such as for laser communications, laser range finders, and laser designators, etc. These uses rely on the fact that collimated beams will expand the least over distance. Another example of the usefulness of collimation is in the use of lasers as cutting tools, such as in laser surgery which also requires the transportation of the laser beam over some distance from the laser to the focussing optic. A diverging beam would spread its energy over a broader area as it propagated through a medium such as air, and would soon lose sufficient energy density so as not to be able to perform its intended function. As another example, collimated beams are used to reduce wavefront curvature errors in interferometry, and to produce accurate reference beams in holography. Further, collimated beams are used to produce accurate and well characterized laser standing waves (counter-propagating plane waves) for nonlinear interaction experiments and for laser velocimetry and anemometry.

For many of the above uses, the lateral cross section of a beam as it exits a laser is often too small. Hence, it is common to expand the beam emitted from the laser by use of a beam-expanding telescope, which in simple form, is a tube with a lens at one end to cause the laser beam to diverge to a second lens at the other end, which then collimates the beam.

Once a laser beam is expanded and collimated, it is important to know the quality of the beam, such as the precision of collimation and the presence or absence of any aberrations in the wavefront. If the quality of the beam is not known, then for some applications the beam may not be particularly useful.

The most common test for collimation at the present time is to measure the beam diameter at two positions along the beam path. A perfectly collimated beam would show the smallest change in beam diameter along the beam path, so if the measured diameter is the same at two points, then the beam is approximately collimated. The problem with measuring the beam diameter at two positions is that it is a very inaccurate measurement. The reasons for the poor accuracy are first that the typical laser beam intensity profile has no sharp edges, but instead follows a Gaussian curve. It is difficult to judge with any accuracy exactly where the edge of the beam is. Second, all laser beams have spatial variation in the intensity caused by diffraction from dust particles in the beam path, dirty optics and other imperfections that cause changes in the intensity profile of the beam over relatively short propagation distances. These changes can substantially degrade the accuracy of measurement of the beam diameter.

Another approach for judging collimation is to use a lateral shearing plate interferometer. This instrument typically consists of an uncoated glass plate with flat surfaces. Some implementations have parallel surfaces, and some have a small angle (wedge) between the surfaces.

In a parallel plate shearing interferometer, the plate is placed at an angle relative to the incident beam to be characterized and two reflections of the incident beam result. One reflection is from the front surface of the glass plate and the other is from the back surface. (Other multiple reflections also occur between the surfaces before they exit the front surface. These multiply reflected beams are, however, much lower in intensity than the two principal beams described, and hence will be ignored in the ensuing analysis.) A screen or other plane, opaque, surface placed in the path of the reflected beams will show the optical axes of two beams separated by a distance s, called lateral shear, which is a function of thickness of the plate, the index of refraction of the shearing plate material, and the angle of incidence.

FIG. 1A shows a plan view arrangement of a lateral shearing plate interferometer with a laser source 111 producing a beam 113 incident on a first end of a beam expanding telescope 114. Beam 113 continues from the other end of the beam expanding telescope, approximately collimated but slightly diverging, and is incident on a shearing plate 115. The beam incident on the shearing plate is shown diverging to an exaggerated degree to facilitate illustration of virtual sources. Distance d between the lenses (not shown) of the beam expanding telescope is adjustable to collimate the expanded beam. (The refraction within the lenses is not shown for ease of illustration.) The outer edges of the incident beam reflect from the front surface of the shearing plate at points 117 and 119.

The outer edges of the incident beam reflect from the back surface at points 121 and 123. The reflected beams, partially superimposed, travel in the direction of arrow 125 away from the shearing plate, and appear to come from two different virtual sources, one at point 127 and the other at point 129. These two virtual sources have a lateral separation, s, the lateral shear, and also an axial separation, 1, called the axial delay. The details of the geometry can be seen more clearly from FIG. 1B. For a shearing interferometer with index of refraction n and thickness t, the shear of the two sources produced by reflection of a beam incident at angle theta is given by $$s = 2 d_1 \cos\theta,$$

where $d_1$ is shown in FIG. 1B. From Snell's Law, $$\sin\theta = n d_1 / (t^2 + d_1^2)^{\frac{1}{2}}$$

Solving for $d_1$ $$d_1 = t \sin\theta / (n^2 - \sin^2\theta)^{\frac{1}{2}}.$$

Thus the shear between the two reflected beams is $$s = t \sin 2\theta / (n^2 - \sin^2\theta)^{\frac{1}{2}}.$$

Similarly, the axial delay 1, is given by $$1 = 2nd_2 - d_3$$

where $$d_2 = n d_1 / \sin\theta$$

and $$d_3 = 2 d_1 \sin\theta.$$

Hence, the axial delay is $$1 = 2t (n^2 - \sin^2\theta)^{\frac{1}{2}}. \tag{1}$$

FIG. 2 shows a theoretical superposition of the two reflected beams of FIG. 1A on a plane surface 131 of FIG. 1A viewed in the direction of arrow 125. The beam scattered from the front surface is represented by circle 133 on surface 131 in FIG. 2 and the beam reflected from the back surface is represented by circle 135. The two beam circles are offset by the distance of the lateral shear s. Area 137 is the area of superposition and interference of the reflected beams. If the laser beam is reasonably free of aberrations and close to collimation, the interference area will show parallel alternating light and dark bands (fringes), approximately as shown in FIG. 2. (To first order, the fringe pattern is sinusoidal in intensity.)

A good treatment of lateral shearing interferometry can be found in the book *Optical Shop Testing*, published by John Wiley and Sons, Inc. of New York, N.Y., and edited by Daniel Malacara, pages 108 through 141, incorporated herein by reference. As may be seen in the referenced publication, interferometry may be used to divine considerable information about an incident beam and any apparatus that is used to emit, transmit, or manipulate the beam.

In the arrangement of FIG. 1A, the spatial period D1 of the vertical fringes is substantially a function of the wavelength Lambda of the beam, the radius of curvature R of the incident wavefront, and the lateral shear s:

$$D1 = (\text{Lambda} \times R)/s$$

As a user adjusts the focus of the beam-expanding telescope by changing d, the spacing of the lenses, the collimation of the beam is changed, thereby changing the radius of curvature R of the propagating wavefront. The radius of curvature can be positive or negative, depending on whether the beam is diverging (convex) or converging (concave), respectively. If the focus of the telescope is changed so the magnitude of the radius of curvature increases, i.e. the wavefront becomes flatter, D1 increases. R increases as the point of wavefront flatness is approached, and R = infinity for a flat wavefront. D1, directly proportional to R, increases as well, and at R = infinity, D1 is also infinite. At some point approaching collimation, depending on Lambda and s, D1 is greater than the width of the region 137 and the user will no longer see vertical fringes. The superimposed region will appear to have uniform brightness, either dark or light.

This presents an essential problem when using the technique: namely that perfect collimation is not necessarily achieved when the fringe pattern disappears, because all that is really known is that D1 has become larger than the width of the overlapping area. If one continues to move the focus in the same direction until the fringes reappear, and then finds a midpoint between the position at where the fringes first disappeared and the position at where they reappear, that will be the point of approximate collimation. There is, however, in the arrangement described above, no precise way to find the midpoint. An additional problem with this device is that there is no indication of the direction to focus the telescope until d is changed.

To improve the accuracy of the lateral shearing plate interferometer, plates have been produced with a small angle (wedge) between the flat surfaces. Using a wedged shearing plate, as the position of collimation is approached, the fringe pattern rotates from the vertical and becomes horizontal. In a wedged shearing plate interferometer it is common to provide a thin wire extending across the plate to cast a horizontal shadow on the screen for a standard for alignment of the interference fringes.

A problem with a wedged shearing plate interferometer is that precise alignment with a shadow line is often difficult. Moreover, an accurate refrence line is difficult to achieve for the standard at the screen, and the elements of the arrangement, such as the interferometer and the screen, must be precisely positioned relative to one another for the shadow line at the screen to represent precise beam collimation. In addition, the angle of the fringes in the fringe pattern change rather slowly, rather than dramatically, as R passes through infinity, so there can be a resolution problem as well.

What is needed is an instrument for determining collimation that is relatively insensitive to alignment, is easy to use, provides a sensitive and precise indication of wavefront flatness, and indicates to a user the direction required when moving the collimating telescope in order to achieve collimation. Such an apparatus should not sacrifice utility for indicating wavefront aberrations, and should avoid the added complexity incurred in interpreting the fringe pattern from a wedged shearing plate interferometer.

SUMMARY OF THE INVENTION

In accordance with preferred embodiments of the invention, an interferometer is provided having a transparent shearing plate with substantially parallel faces and a means for oscillating the orientation of the shearing plate about an axis. In the preferred mode, the axis is parallel to a diameter of the plate, and the movement is effected by a pivot element for rotating the shearing plate back and forth about the axis to cause the oscillation. In one preferred embodiment an electromechanical drive element coupled to the shearing plate provides an oscillating force to cause the rotation of the shearing plate. In another embodiment, the shearing plate is mounted as a physical pendulum and gravity is used as the driving force to cause the oscillation.

In the electromechanically driven embodiment, the movement system includes a stationary portion and a mounting means for mounting the shearing plate, with the mounting means and the stationary portion attached to each other by means of the pivot element, the shearing plate being fixedly mounted in the mounting means. The movement system includes a drive coupled to the stationary portion and to the mounting means for forceably causing an oscillatory rotation between the stationary portion and the mounting means, with the oscillatory rotation having an axis of rotation through the pivot element so as to oscillate the orientation of the shearing plate relative to the stationary portion. In the preferred mode, the pivot element includes a flexure hinge for causing a restoring force between the stationary portion and the mounting means. The drive system includes a wire affixed to the stationary portion and to the mounting means, with the wire tensioned to deform the flexure hinges such that the mounting means is rotated relative to the stationary portion. An electrical power and control element periodically heats the wire such that the mounting means is caused to oscillate relative to the stationary portion.

According to a preferred method of the invention, a coherent beam of light is collimated by placing a transparent shearing plate with substantially parallel faces in the light beam at an angle to the beam such that reflections from the front and back surfaces of the shearing plate have both shear and axial delay, thereby forming an interference fringe pattern on an intercepting surface. The axial delay is then oscillated such that fringes in the interference fringe pattern translate back and forth on the intercepting surface, and the collimation of the light beam is adjusted until the fringes no longer appear to translate, but become instead a stationary alternating light and dark region on the intercepting surface. At the point of collimation, the translating fringes appear to change abruptly to an on-and-off blinking pattern of light and dark, with no discernable translation from one direction to another. This on-and-off blinking pattern provides a dramatic and precise indication that correct adjustment has been achieved.

Another aspect of the invention is the electromechanical drive system itself. Conceptually, the drive system is a microtranslator, which has been especially adapted for use with the shearing plate interferometer. The translator can be thought of as a wire having a first end and a second end and a holding element for attaching the first end and the second end so as to hold the wire under tension. Also included is a driver element for changing the temperature of the wire. The wire has a thermal expansion coefficient such that the distance between the ends of the wire changes in response to the changing temperature. In the preferred mode, the wire comprises an electrical conductor, and the driver element provides a current through the wire to cause the changing temperature. Also in the preferred mode, the holding element includes a spring function for holding the wire under tension.

Those skilled in the art will appreciate that there are many other uses for such a micro-translator according to the invention.

DESCRIPTION OF THE PREFERRED EMBODIMENTS

Figure 3:
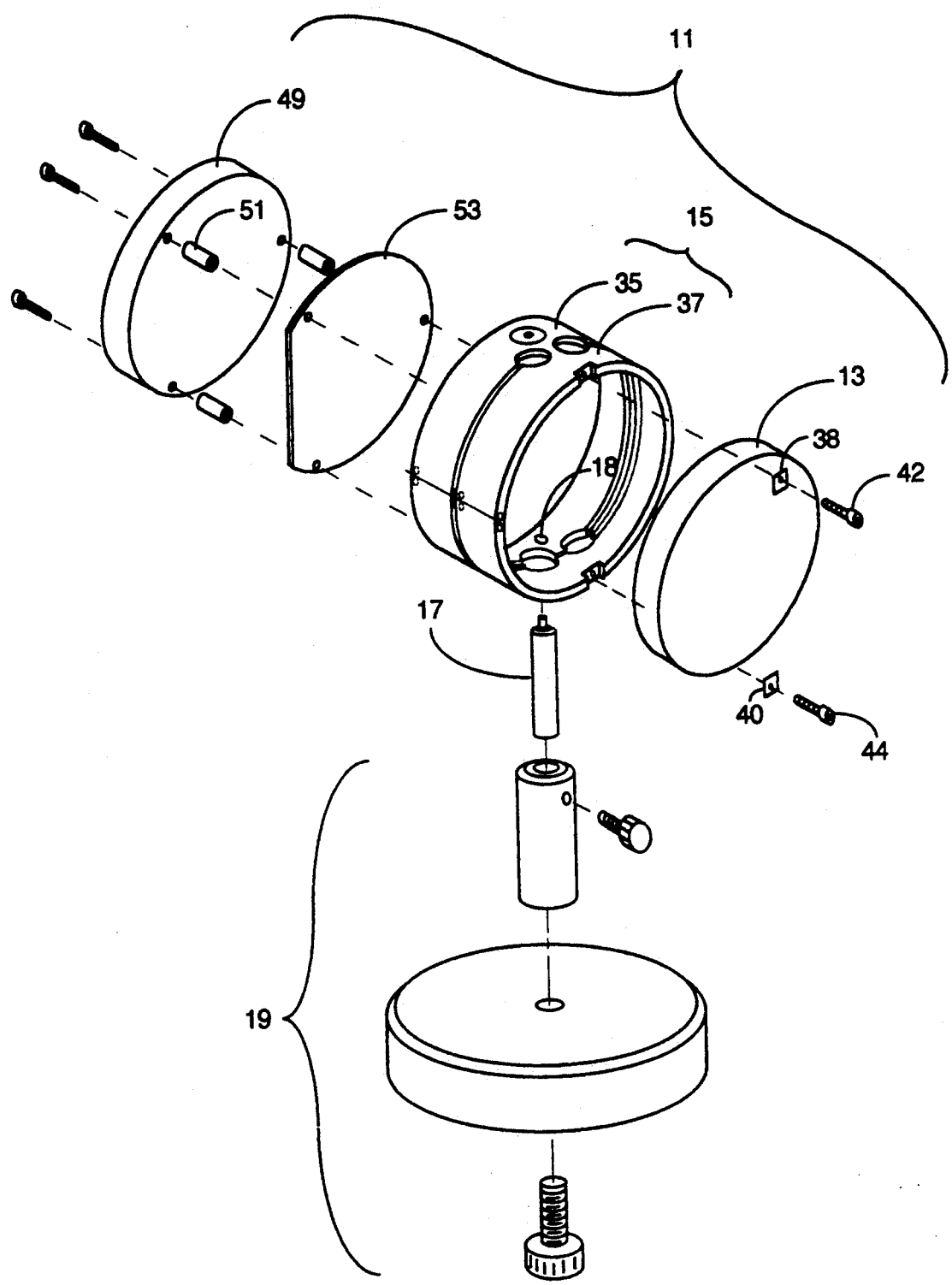
FIG. 3 is an expanded view of a dynamic lateral shearing interferometer according to a preferred embodiment of the invention.

Illustrated in FIG. 3 is an expanded view of a COLLIMETER dynamic lateral shearing interferometer 11 for gauging the flatness or collimation of laser wavefronts. Interferometer 11 includes an uncoated, plane-parallel glass plate (i.e. shearing plate), hereinafter etalon 13, mounted in a ring structure 15, typically constructed of black-anodized aluminum, although other materials could also be used.

The mounting ring is partially split into a front half 37, which houses etalon 13, and a back half 35 which is attached via a threaded mounting hole 18 to a mounting post 17, such as an industry standard stainless steel ½ inch (1.27 cm) post. The mounting post is supported by a stable base assembly 19 that includes provisions for adjusting the height of the optical axis of the COLLIMETER interferometer.

Figure 4:
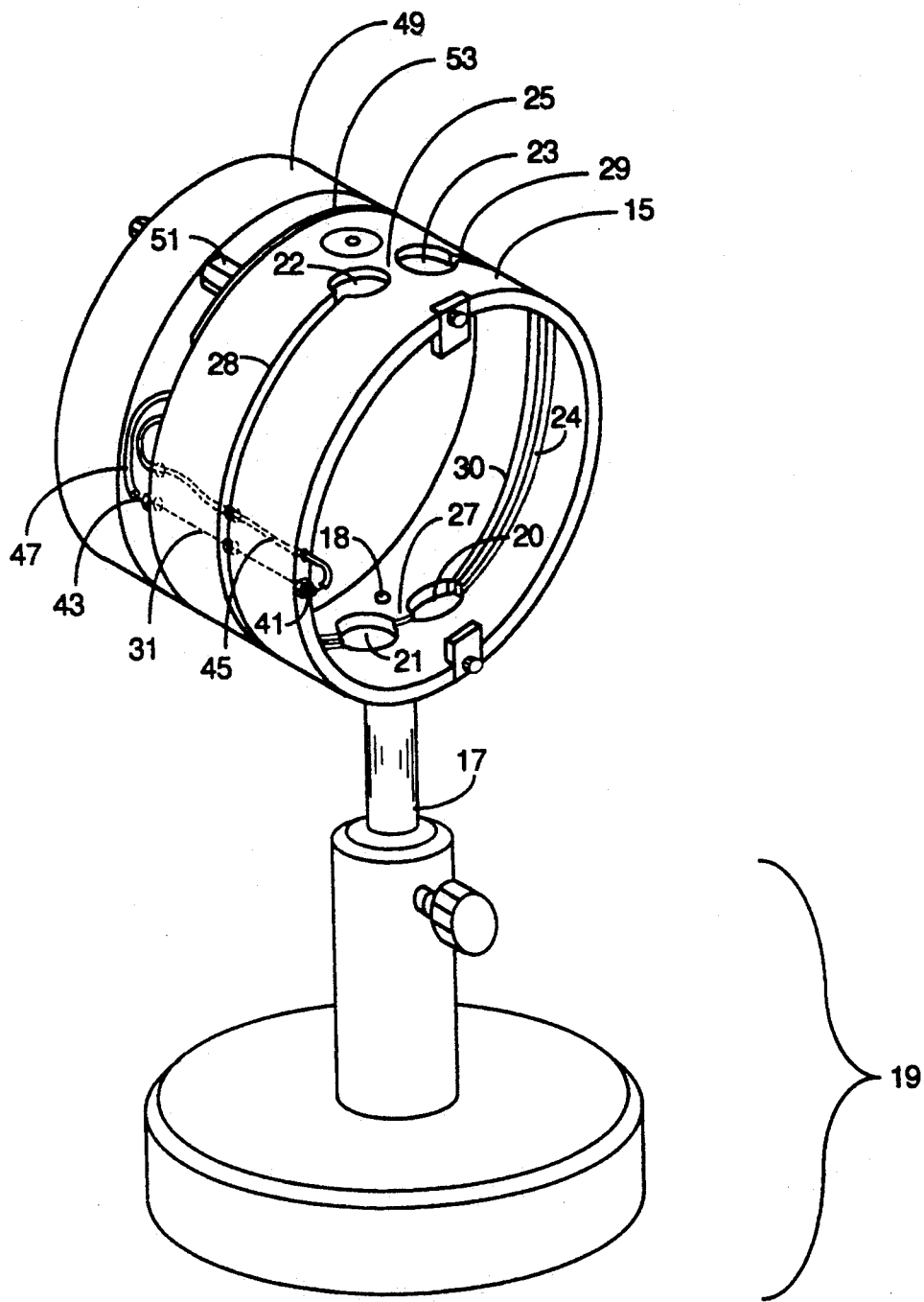
FIG. 4 is an assembled view of the interferometer of FIG. 3.

As can be seen more clearly in FIG. 4, the mounting ring has been partially split by cutting through the ring in the middle along a vertical axis, with cuts 28 and 29 terminating in two pairs of stress relief drill holes 20 and 21, and 22 and 23. A saw cut of about 1/16 inch (0.16 cm) in width is preferred. The uncut regions between the pairs of drill holes form an integral pair of flexure hinges 25 and 27 located along a vertical diameter of the etalon.

The flexure hinges permit a small amount of frictionless oscillation of the etalon and its mounting ring relative to the base assembly. As will be discussed subsequently, this motion can be used to change the angle of incidence of a laser beam being tested, thereby causing an associated interferometer fringe pattern to be scanned from side to side. In the preferred mode, the mounting ring is constructed of a piece of aluminum pipe, 3 inch (7.62 cm) schedule 80, 6061-T6 aluminum, having a length of about 1.375 inches (3.5 cm). Nominally the pipe has a standard inner diameter of 2.9 inches (7.37 cm).

In order to accommodate a 3 inch etalon that is ½ inch (1.27 cm) thick, the pipe is typically milled to provide an opening of 3.01 to 3.02 inches (7.65 to 7.67 cm) on one side that is slightly deeper than ½ inch (1.27 cm), 0.550 inches (1.40 cm) being preferred. This also provides a land 30 for the etalon near the middle of the pipe. The etalon is mounted in front half 37, against land 30, and is held in place by two tabs 38 and 40 held by two screws 42 and 44. Also in the preferred mode, the diameter of drill holes 20-23 is ⅜ inches (0.95 cm) with a center-to-center separation between adjacent pairs being about 0.438 inches (1.11 cm), leaving a separation between the edges of the holes of about 1/16 inches (0.16 cm) for the flexure hinges. Those skilled in the art will appreciate that these dimensions can vary considerably depending on the desired elastic constant of the flexure hinges and the materials being used for the ring.

The etalon in the preferred embodiment is nominally a 3 inch by ½ inch thick plate of BK-7 glass. Other materials, such as fused silica may also be used. The etalon in the preferred embodiment has a flatness specification of less than or equal to Lambda/10 at 633 nanometers with a clear aperture of 3 inches. Also in the preferred mode, the residual wedge is specified at less than Lambda/10 at 633 nanometers. Those skilled in the art will appreciate that these specifications have been chosen to obtain a desired precision in determining wavefront collimation, and that other specifications would yield different measures of precision.

Figure 1B:
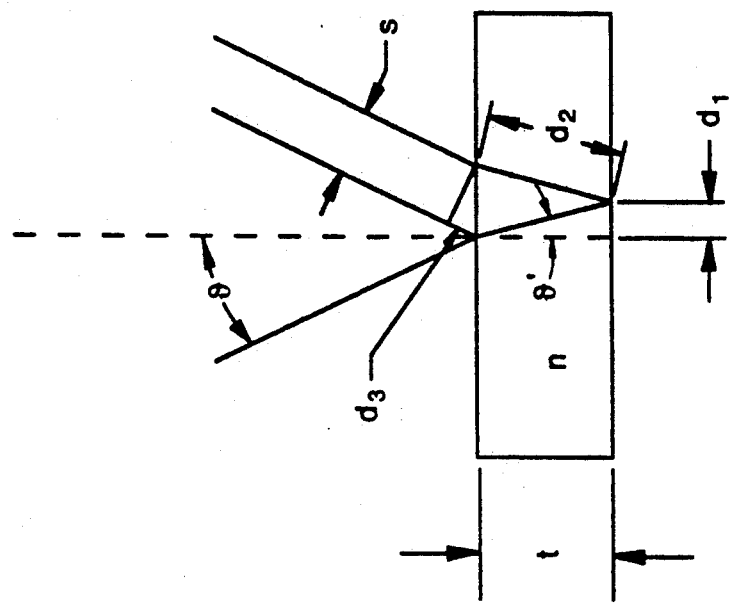
FIG. 1B is a cross-sectional view of the shearing plate of FIG. 1A showing the geometry of various rays of light traversing and reflecting from the shearing plate.
Figure 1A:
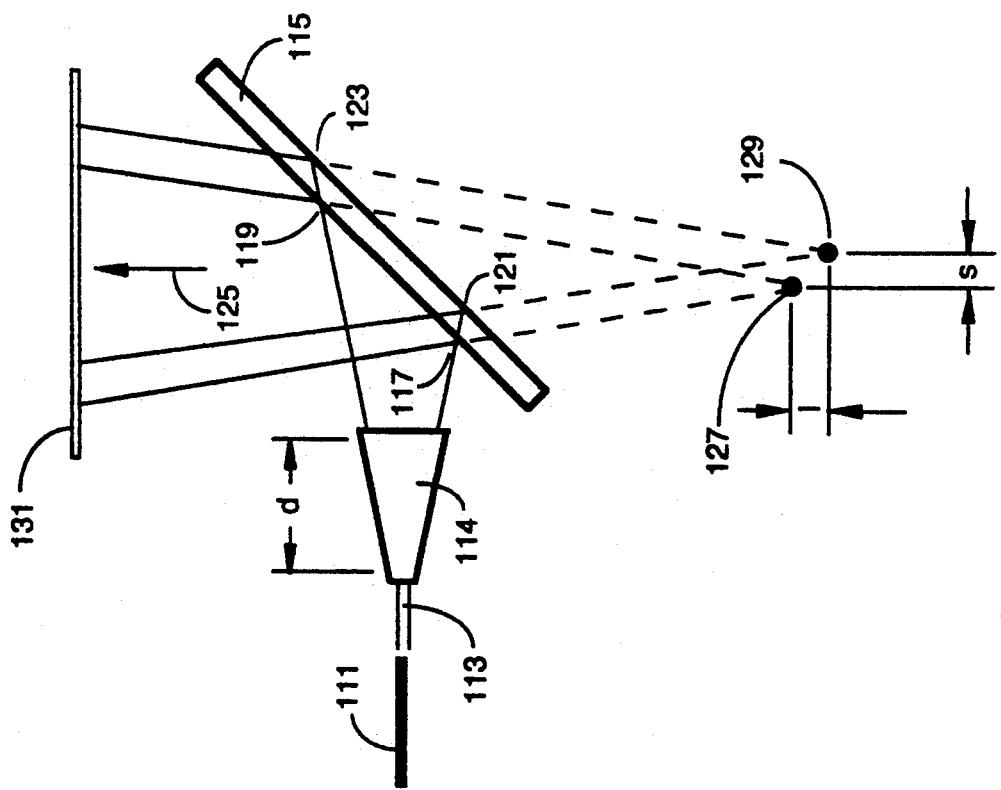
FIG. 1A is a plan view of a shearing plate arranged at an angle with respect to a laser source, a beam expanding telescope and a display surface to illustrate the principles of lateral shearing interferometry.
Figure 5:
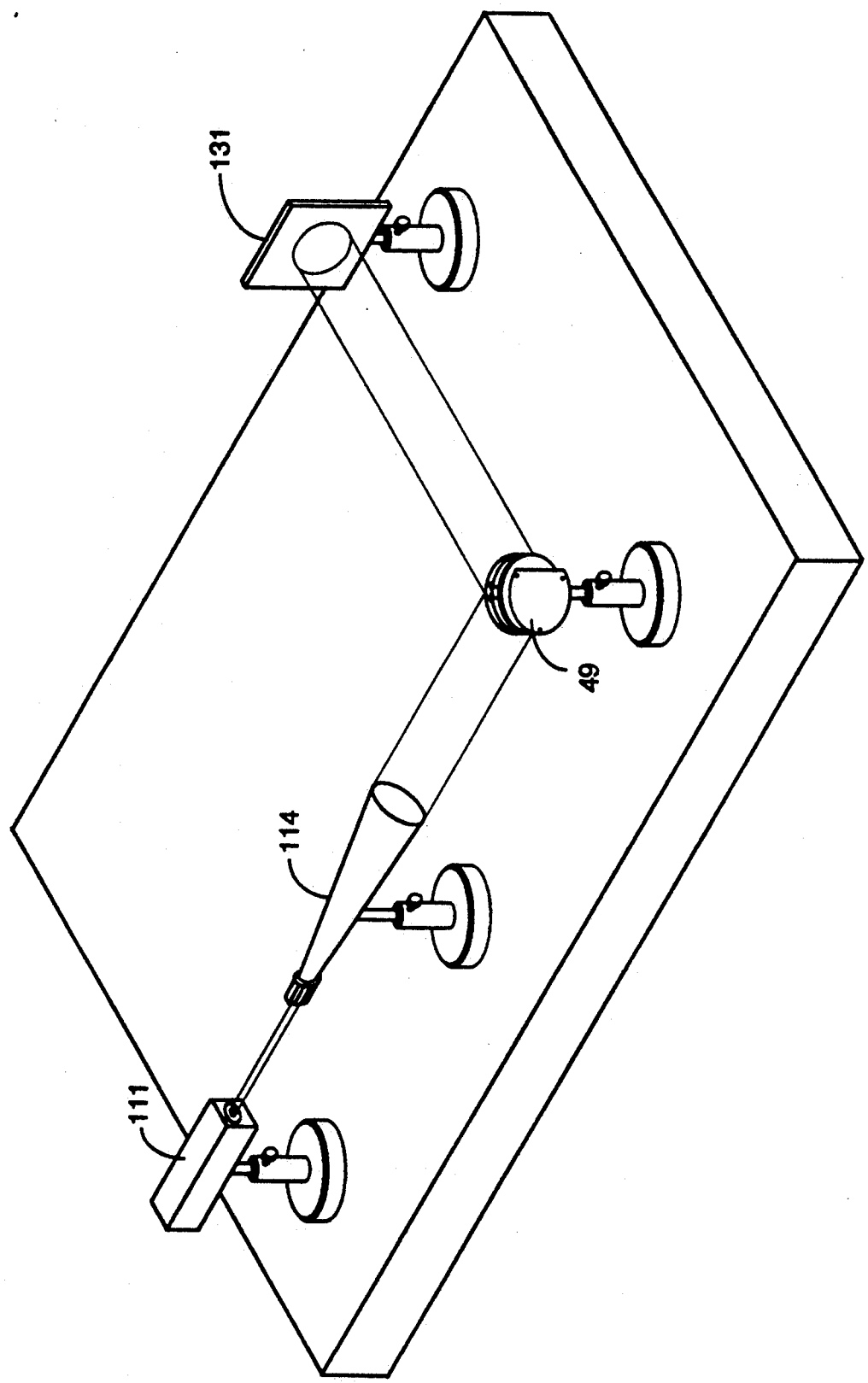
FIG. 5 shows a setup for using the COLLIMETER.

In practice, for a collimation setup, the COLLIMETER is arranged in substantially the same manner as for a fixed lateral shearing plate interferometer. The typical configuration is shown in FIG. 5. Similar to FIG. 1A, laser 111 is incident on beam expanding telescope 114, which directs the expanded beam onto COLLIMETER 49 at an angle, which in turn directs the resulting beams onto screen 131 where the interference pattern is viewed. The angle of the etalon with the beam is not critical, but optimum performance is obtained with a placement angle of 30 to 50 degrees. For an etalon with an index of refraction of about 1.5, maximum shear occurs at about 50 degrees.

Angular motion to cause a controlled scan of the fringe pattern is provided in the preferred embodiment by a ThermX (TM) translator, available from Blue Sky Research, Inc. of San Jose, Calif. The ThermX translator includes a wire 31 (FIG. 4) that is connected under tension between front half 37 and back half 35 of ring structure 15. An electrical circuit, hereinafter the ThermX translator driver, including control electronics that periodically heats the wire is contained in package 49. When the wire is not being heated it is cooled by radiation and convection to its surrounding environment. (The ThermX translator and driver will be discussed in more detail subsequently.)

Wire 31 is connected to two threaded studs 41 and 43 (FIG. 4), which are electrically insulated from the ring and which are connected to each of two power wires 45 and 47 that lead to the ThermX translator driver mounted in package 49 to the backside of the COLLIMETER ring structure. Driver Package 49 is separated from ring structure 15 on spacers such as spacer 51, and a thermal shield 53 is assembled between the ring and driver to prevent heat from the driver from affecting the thermal stability of the etalon. The driver package could as well be mounted elsewhere, for example in the base, but the mounting shown in FIG. 4 has the advantage of allowing the power wires to be short.

Nuts engage the threaded studs 41 and 43, and are used to apply initial tension on the flexure hinges, which in turn compress the front and back sides of the split ring structure toward each other, so that the gap of cut 28 is decreased. The initial displacement is about 0.1 mm, which results in an initial angular displacement of the etalon of about 0.14 degrees.

When wire 31 is heated or allowed to cool, it elongates or contracts ideally in proportion to its length and its thermal expansion coefficient. Hence, front half 37 which holds the etalon oscillates about the flexure hinges relative to rear half 35 through a small angle, smaller than the initial displacement angle, typically about 0.003 degrees. The small angle is sufficient for the desired scan of 5 to 10 fringes, and a precise and repeated angle is not important.

The self-contained ThermX translator driver is powered by a DC power supply (not shown). When the COLLIMETER is connected to the power supply, the driver causes the COLLIMETER etalon to scan through a small angle about the vertical axis defined by the flexure hinges of the ring structure. This small angle scan, which has a period of 5 to 10 seconds, changes the axial delay of the light reflected from the front and back surfaces of the etalon so that the axial delay becomes an oscillatory function of time. This causes the fringe pattern to appear to move horizontally back and forth through the illuminated overlap region of the reflected beams.

An LED D1 (See FIG. 6) is mounted on the outside of the driver package 49, so that it can be seen by the operator. D1 is illuminated when wire 31 is heated and allows the operator to correlate the scanning direction with the etalon movement. A first trial allows an operator to also correlate the scanning direction with a convex or concave wave front. Thus, the required direction to focus a beam expander toward collimation is intuitive after the first trial. As the incident beam approaches collimation, the fringe spatial period increases and, at the point of collimation, becomes infinite in extent. Hence, the overlapping region where the fringes are displayed changes from a scanning of fringes to a blinking pattern, i.e. a pattern that is illuminated and not illuminated, similar to a light being turned on and off. The transition from scanning fringes to blinking at the precise point of collimation is very abrupt, so that the COLLIMETER is a very sensitive instrument for gauging collimation.

Stated another way, the COLLIMETER exploits the angular dependence of the axial delay in order to produce a scanning fringe pattern display. These results can be explained mathematically as described below. The change in axial delay with change in incidence angle is found by differentiating equation (1):

$$\partial l/\partial\theta = -(t\sin 2\theta)/(n^2 - \sin^2\theta)^{\frac{1}{2}}.$$

Figure 7:
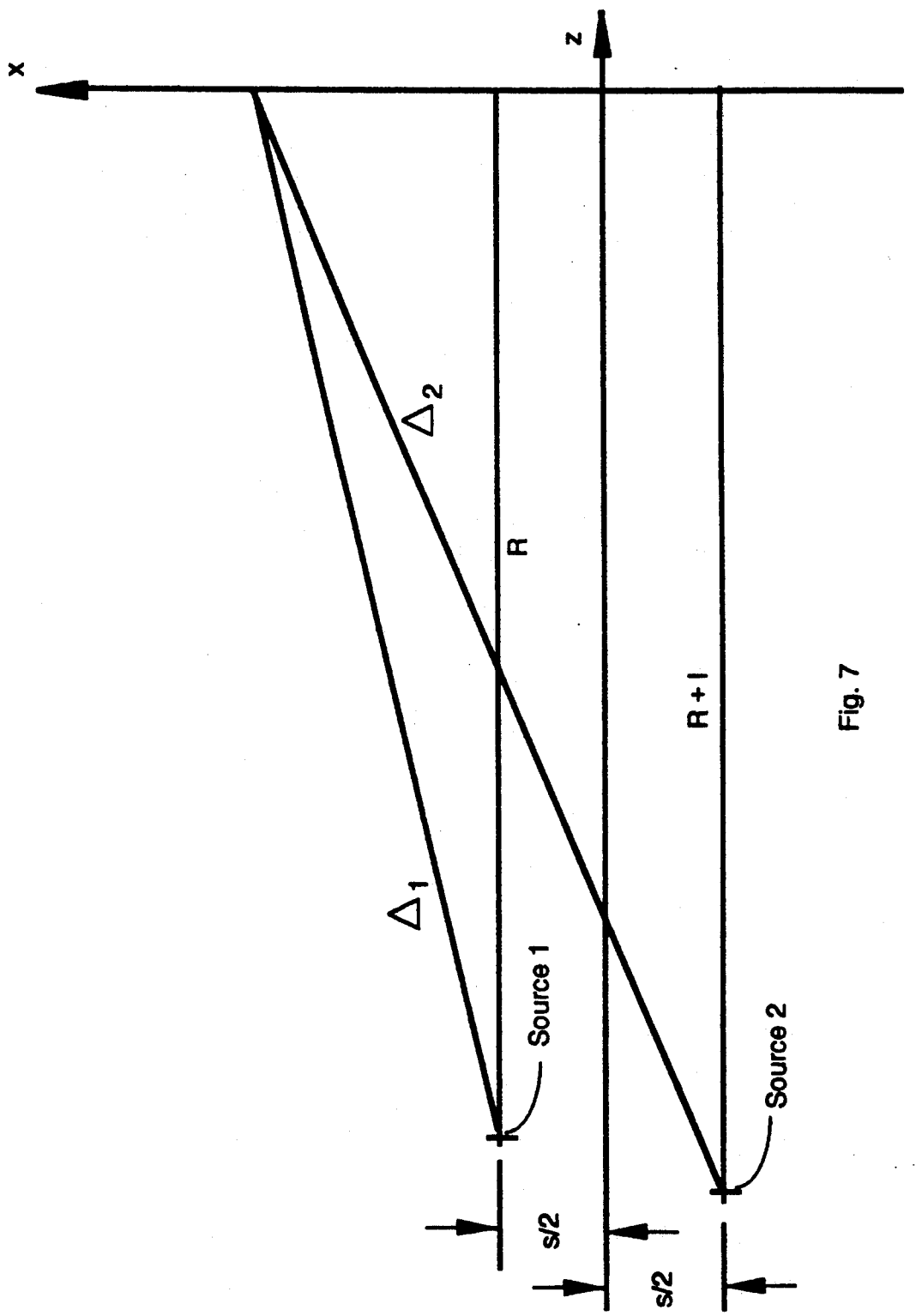
FIG. 7 shows details of the geometric principles associated with shearing interferometry.

The fringe pattern produced by the COLLIMETER results from the interference of the wavefronts produced by two virtual sources as shown in FIG. 7. The two sources are located at $x_1 = s/2$, $z_1 = -R$, and $x_2 = -s/2$, $z_2 = -R - 1$. The fringes are observed along the x-axis, which is in the plane of the two sources. At position x in the fringe observation plane at $z=0$, the optical path length from the first source is $$\Delta_1 = [(x-s/2)^2 + R^2]^{\frac{1}{2}}$$

and the optical path length from the second source is $$\Delta_2 = [(x+s/2)^2 + (R+1)^2]^{\frac{1}{2}}.$$

If the distance R to the two sources is large compared to x, s and l, then the difference in the optical path lengths from the source is $$\Delta = \Delta_2 - \Delta_1 \doteq xs/R + 1$$

Figure 2:
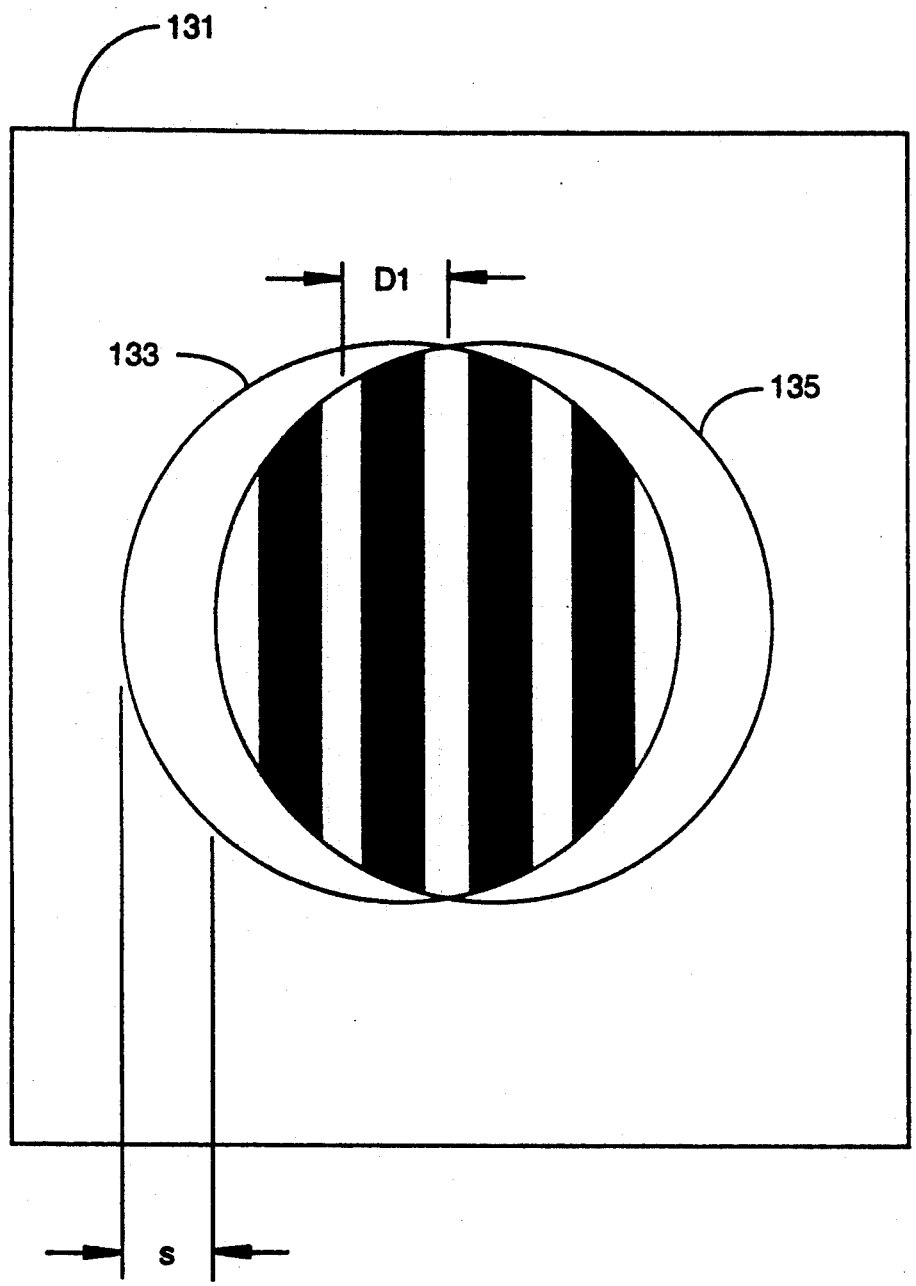
FIG. 2 is a view of an interference pattern produced by the arrangement of elements of FIG. 1.

Since the optical path length difference $\Delta$ is linear in x, and since multiple reflections from an uncoated etalon can be neglected due to their weakness, the interference pattern from a lateral shearing interferometer illuminated with a nearly collimated spherical wave produces a sinusoidal fringe pattern along the x-axis with a period $D1 = (LAMBDA\ R)/s$, as indicated earlier. For a perfect optical system, the fringe pattern would be similar to that shown in FIG. 2. A collimated laser beam, for which R equals infinity, will produce fringes with infinite width so that the observed fringe intensity appears to be uniform over the overlap region. Hence, as the axial delay shear is oscillated, the interference pattern appears to blink on and off.

Those skilled in the art will understand that the system for changing the relative separation of the front half and the back half of ring structure 15 need not be the ThermX translator, but could be also be another kind of electromechanical system. For example, one could use a stack of piezoelectric crystals, an electromagnet, or even a motor-driven screw. The ThermX translator is, however, a much simpler and more elegant implementation of a displacement system for such moderately small displacements.

In an alternative preferred embodiment of the COLLIMETER dynamic lateral shearing interferometer, the etalon is caused to oscillate as a pendulum, and the ThermX translator is not used. The pendulum embodiment has an advantage in simplicity and cost over the ThermX-driven embodiment, but it requires a very low friction mounting for the etalon so that the pendulum action will continue for an adequate time to complete the collimation procedure. This very low friction mounting is generally very fragile compared with the ThermX-driven system.

Figure 8:
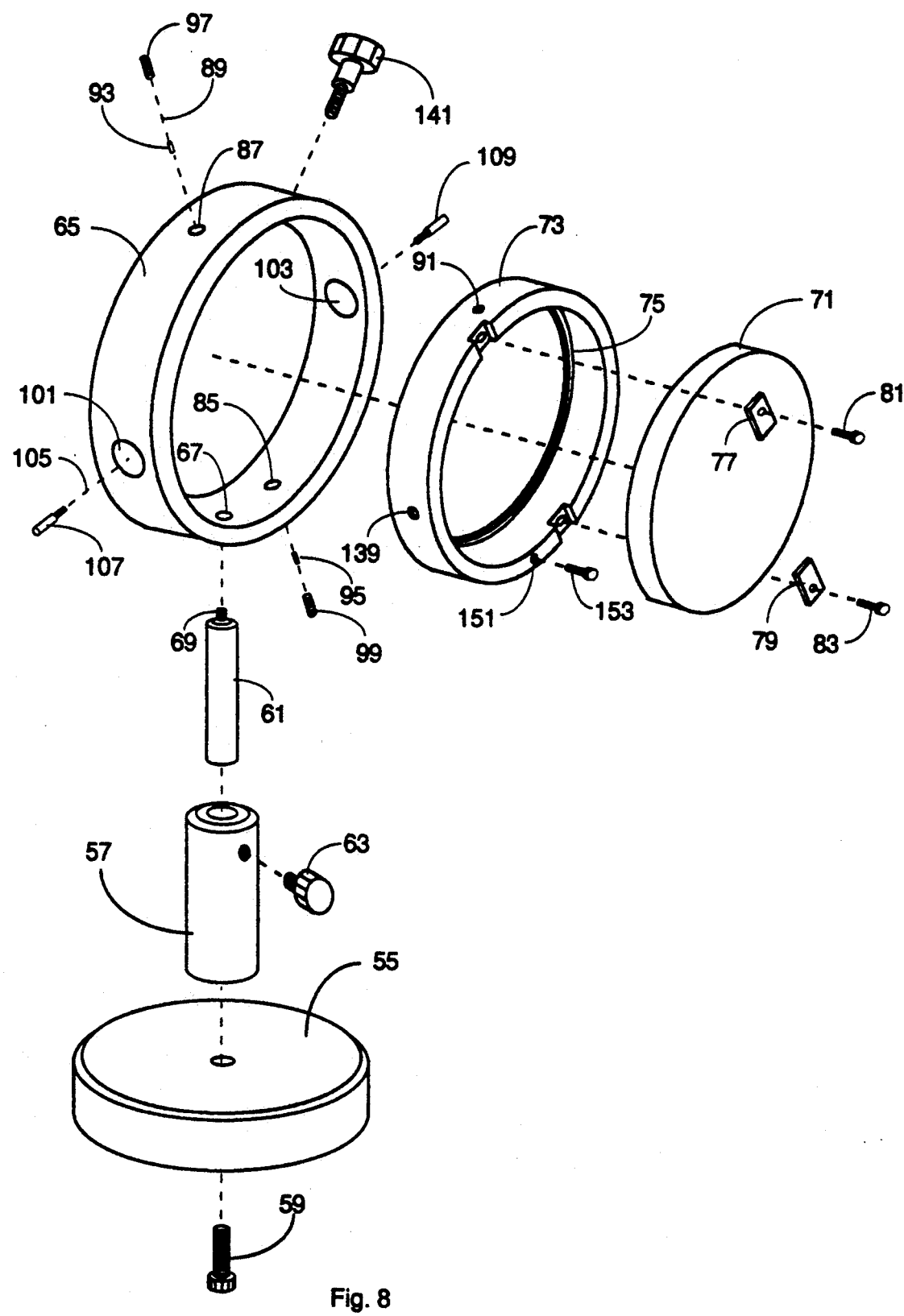
FIG. 8 is an expanded view of an alternative preferred embodiment of the invention in which the shearing plate moves as a pendulum.

FIG. 8 is an expanded view of the pendulum embodiment of the COLLIMETER showing a stable base 55, a hollow mounting cylinder 57 which attaches to base 55 by a screw fastener 59, a mounting post 61 that slides into the mounting cylinder and is secured by a screw fastener 63, so the height of the COLLIMETER above a supporting surface may be adjusted.

An outer ring 65, preferably of black anodized aluminum, mounts securely to post 61 by means of a threaded hole 67 engaging a threaded stud portion 69 of post 61. An etalon 71, the same as the etalon in the ThermX-driven embodiment, mounts in an inner ring 73 against a shoulder 75 and is held in place by two tabs 77 and 79 secured by two screws 81 and 83. The inner ring in the pendulum embodiment is similar to the mounting ring in the ThermX-driven embodiment, except that there are no drilled holes or saw cuts to provide flexure hinges.

The outside diameter of inner ring 73 is about 4 inches and is about an eighth of an inch smaller in diameter than the inner diameter of ring 65. Two threaded holes 85 and 87 pass through ring 65 on a common axis 89 and two conical indentations are machined into inner ring 73 which are aligned with axis 89 in assembly. One such indentation 91 is seen in FIG. 8 and the other is hidden below the ring.

Jeweled pivot bearings (not shown) are pressed into indentations, and steel posts 93 and 95 are assembled into holes 85 and 87, each engaging its respective jeweled bearing in the depressions in the inner ring. The steel posts are held in place by set screws 97 and 99, so that the inner ring pivots on the steel posts. Other hardened bearings would also be useful in the assembly. Two clearance holes 101 and 103 pass through ring 65 on an axis 105 that is substantially parallel to the flat end surfaces of the ring and at about a right angle to axis 89.

With inner ring 73 in place on the pivot bearings, two limiting posts 107 and 109 anchored in ring 73 extend into clearance holes 101 and 103. The posts are somewhat smaller in diameter than the clearance holes, so inner ring 73 is restricted to pivot on the bearings by a few degrees in either direction from the position where the etalon surfaces are parallel with the flat ends of the outer ring. Threaded hole 139 in ring 73 is for post 107. The threaded hole for post 109 is not shown in FIG. 8.

Figure 9:
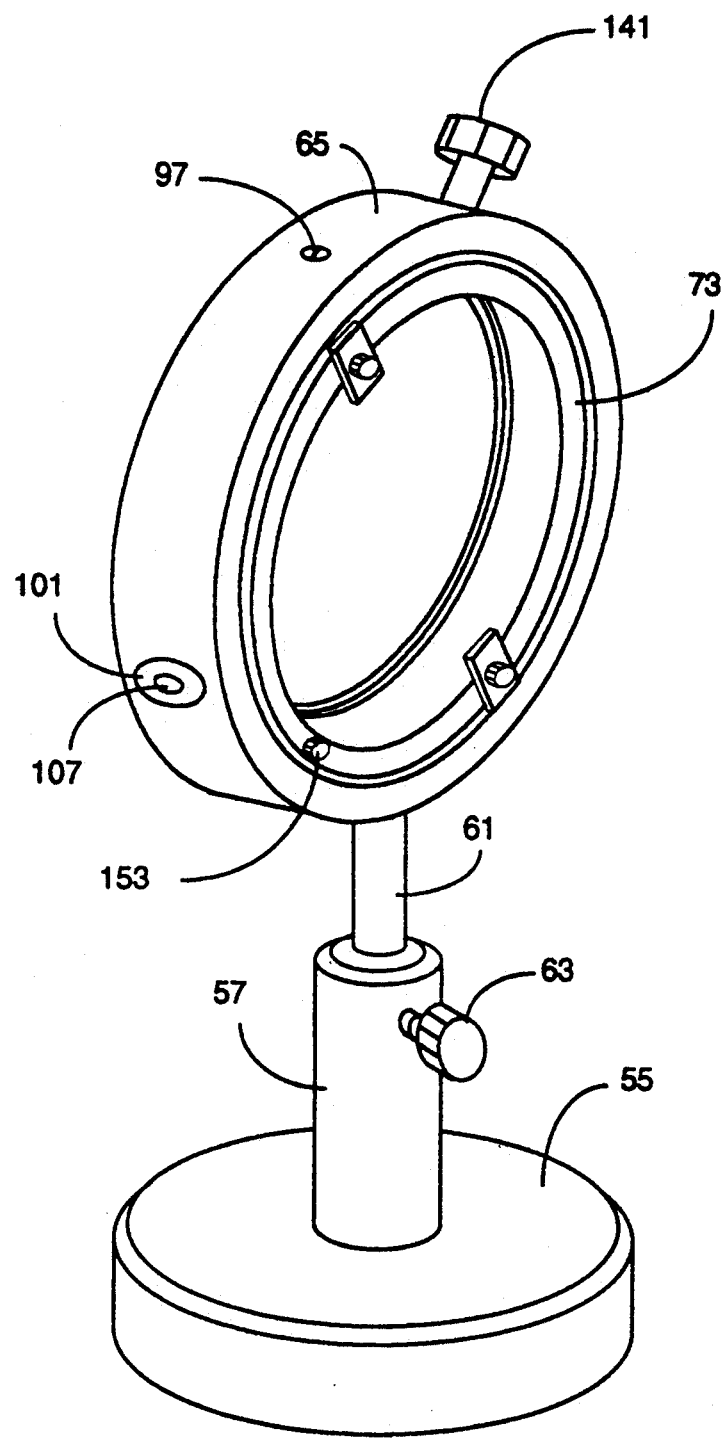
FIG. 9 is an assembled view of the pendulum embodiment of FIG. 8.

Axis 89 for the bearing pivots for the inner ring is substantially parallel to the flat ends of the outer ring, which form parallel vertical planes in the preferred embodiment, and is inclined to vertical by about 15 degrees. When the collimeter is assembled, axis 89 passes through the center of gravity of the assembly of the inner ring and the etalon, and a counterweight 151 of a few grams is attached near the bottom of the inner ring at threaded hole 153 so that the inner ring and etalon behave as a physical pendulum. The particular location and mass of the counterweight are determined empirically to produce a pendulum period of a few seconds, thus producing a motion similar to the operation of the ThermX-driven embodiment. A threaded knob 141 passes through a threaded hole in outer ring 65 to bear against the inner ring and immobilize the inner ring when the interferometer is not in use. FIG. 9 shows this alternative embodiment in assembled form.

In operation the pendulum embodiment of the COLLIMETER behaves very similarly to the ThermX-driven embodiment. Lacking electronics, the pendulum embodiment does not have an LED to signal an operator the direction of movement of the etalon, however. An experimental change in the collimation of an incident beam in a known direction is necessary to establish the direction toward collimation. At the point of collimation, the fringe display abrubtly changes to an on-off blinking, just as with the ThermX-driven embodiment.

It should be noted that the COLLIMETER may also be used as a static interferometer, e.g. to characterize wavefronts as to aberrations and the like; this may also be done with the scanning feature on.

Figure 12:
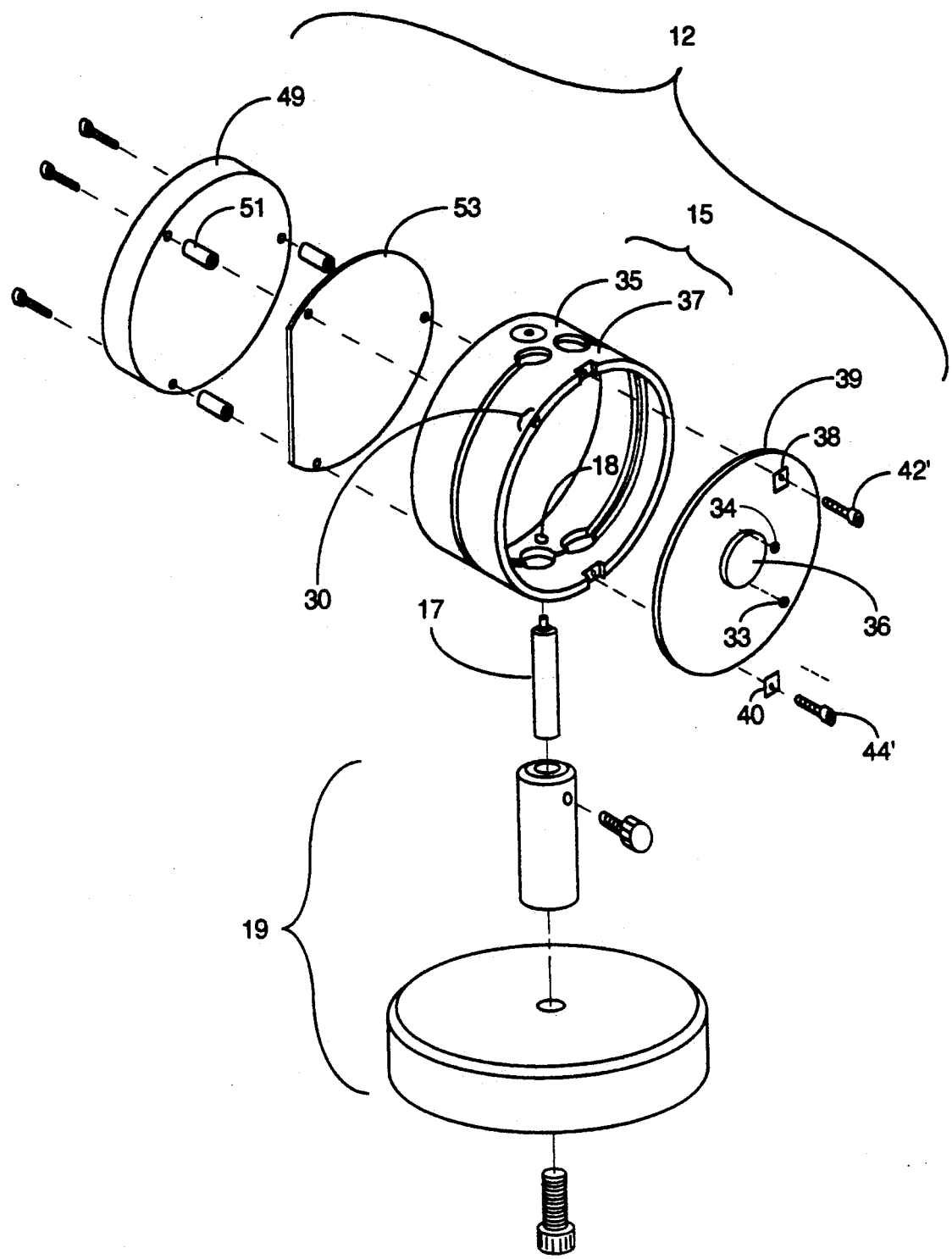
FIG. 12 shows an inner portion of an alternative embodiment of the invention which is useful for laser beams that are small in diameter, the embodiment being illustrated in expanded form.
Figure 13B:
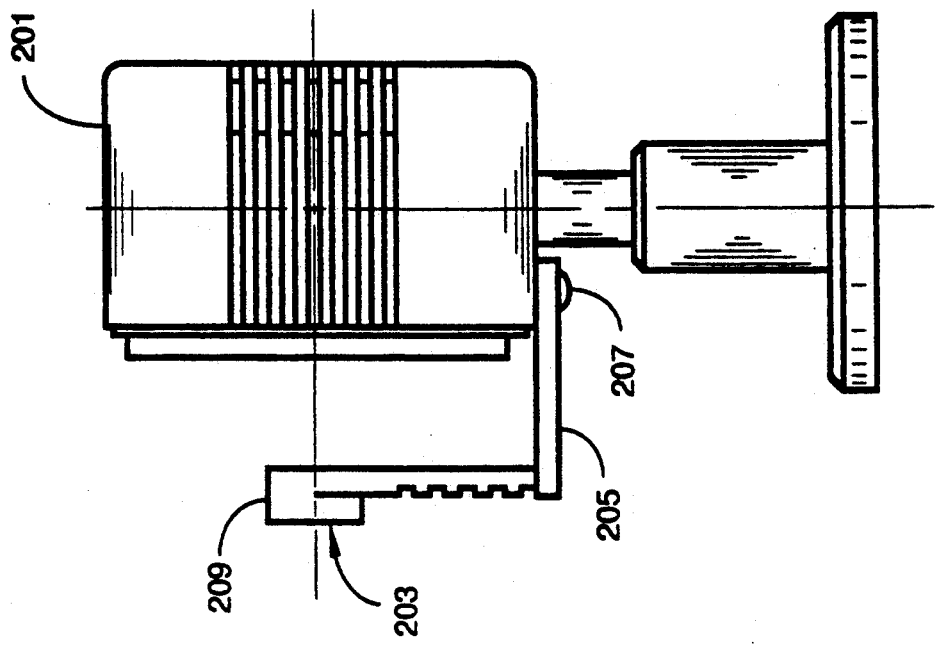
FIG. 13A and 13B show front and side views, respectively, of the finished and assembled form of the embodiment of FIG. 12.
Figure 13A:
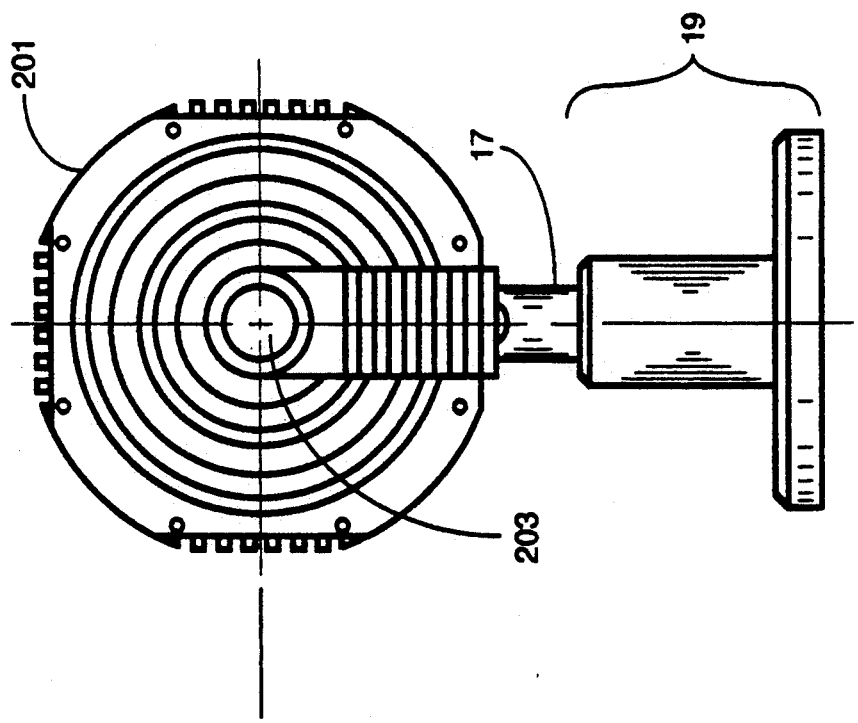
Figures 14A, 14B:
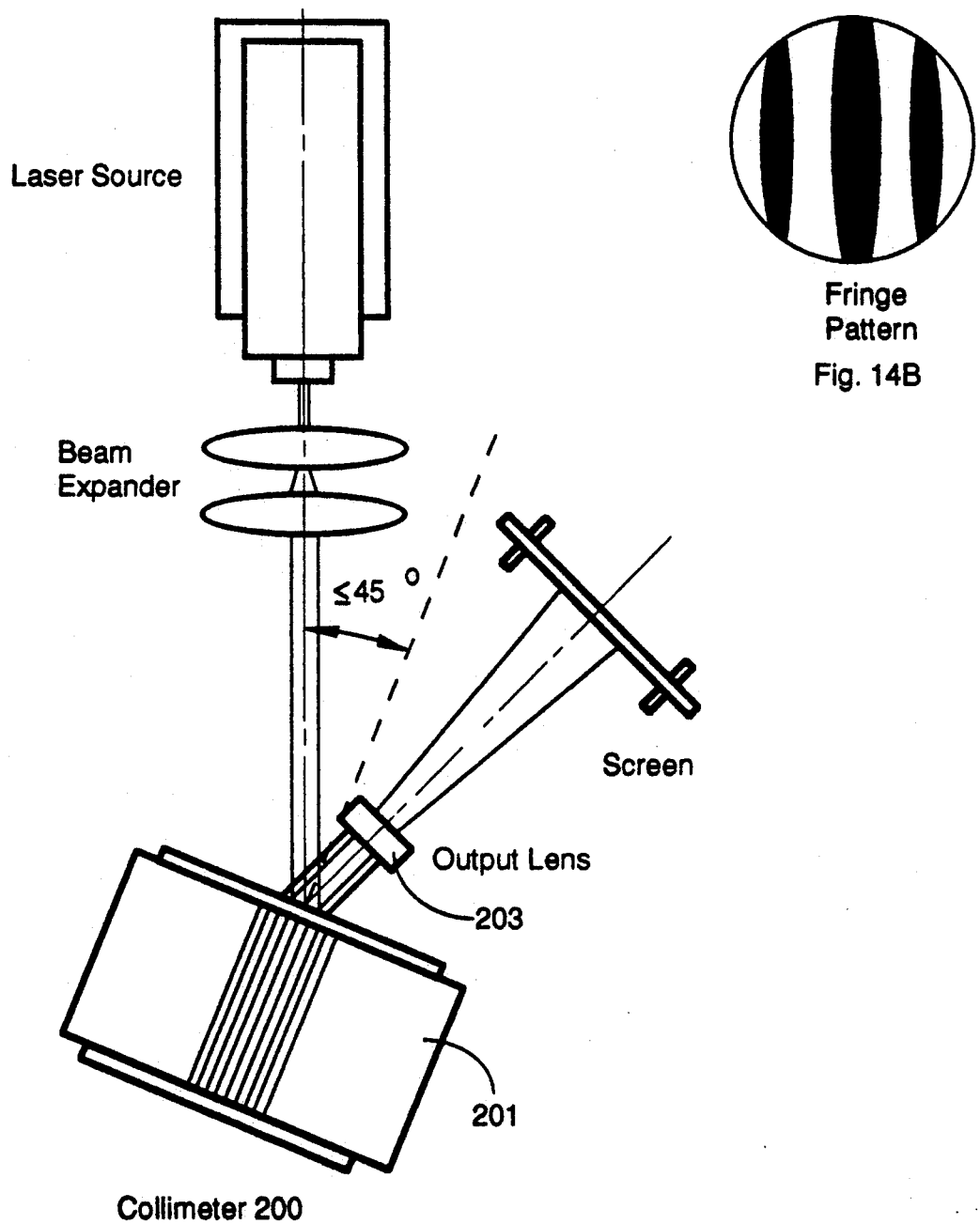
FIG. 14 shows the embodiment of FIG. 12 as it would be used in determining collimation of a small diameter laser source.

Another ThermX ™ -driven preferred embodiment of a collimation gauge 12 is illustrated in FIGS. 12, 13, and 14, which is especially adapted to determine collimation of small diameter beams, for example, down to approximately 2 mm diameter. In this embodiment, a full three-inch diameter etalon is not used, but instead the etalon is replaced by an aluminum plate 39 which has a hole in its center where a much smaller etalon 36 is placed. In the preferred mode, this smaller etalon is typically about 3 mm in thickness and about 25.4 mm in diameter, and is constructed of BK-7 glass. It is held against the aluminum plate 39 by two pads 33 and 34 which are held in place by two screws (not shown). This etalon is much thinner than the larger diameter one, in order that there be some overlap in the field pattern from the front and rear faces of the etalon when used with small diameter beams, otherwise no fringe pattern would be visible. The aluminum plate is held in place as before with two pads 38 and 40, but by shorter screws 42′ and 44′. Also, in order to provide a larger change in angular extent of oscillation, holes 30 for the ThermX ™ wire are moved upwards along the ring 15 relative to the previous embodiment. In this preferred mode, the holes are located on the ring at a point that provides a moment art for the wire of about one-half inch relative to the diameter defined by the flexure hinges. FIG. 13A and FIG. 13B show a decorative outer housing 201 that is placed over the collimation gauge 12 in order to protect the mechanical and electrical systems of the gauge. The housing 201 also serves to hold a rotatable arm 205, which is mounted thereto by a pin 207 that is located substantially in the plane of the etalon 36. The rotatable arm has a lens holding element 209 that holds an expansion lens 203 in place. In the preferred mode, lens 203 is a bi-concave lens about 25.4 mm in diameter having a focal length of about −25 mm and is used to expand the beams reflected from the etalon 36 so that the fringe pattern can be viewed more easily. This function can be seen more cleary in FIG. 14. As in the previous embodiments, light from a laser source is expanded and is incident on the collimation gauge, illustrated by the housing 201. In this case, however, the rotatable arm 205 (not shown) is moved so as to locate expansion lens 203 in the paths of the overlapping beams reflected from the etalon 36. Lens 203 expands the beams and their resulting fringe pattern and directs them to a screen where they can be viewed visually or by automated methods. As illustrated, in the preferred mode, the beam incident from the beam expander impinges on the etalon 36 at an angle of about 45 degrees, although other angles could be used.

ThermX Translator and Driver

Figure 10:
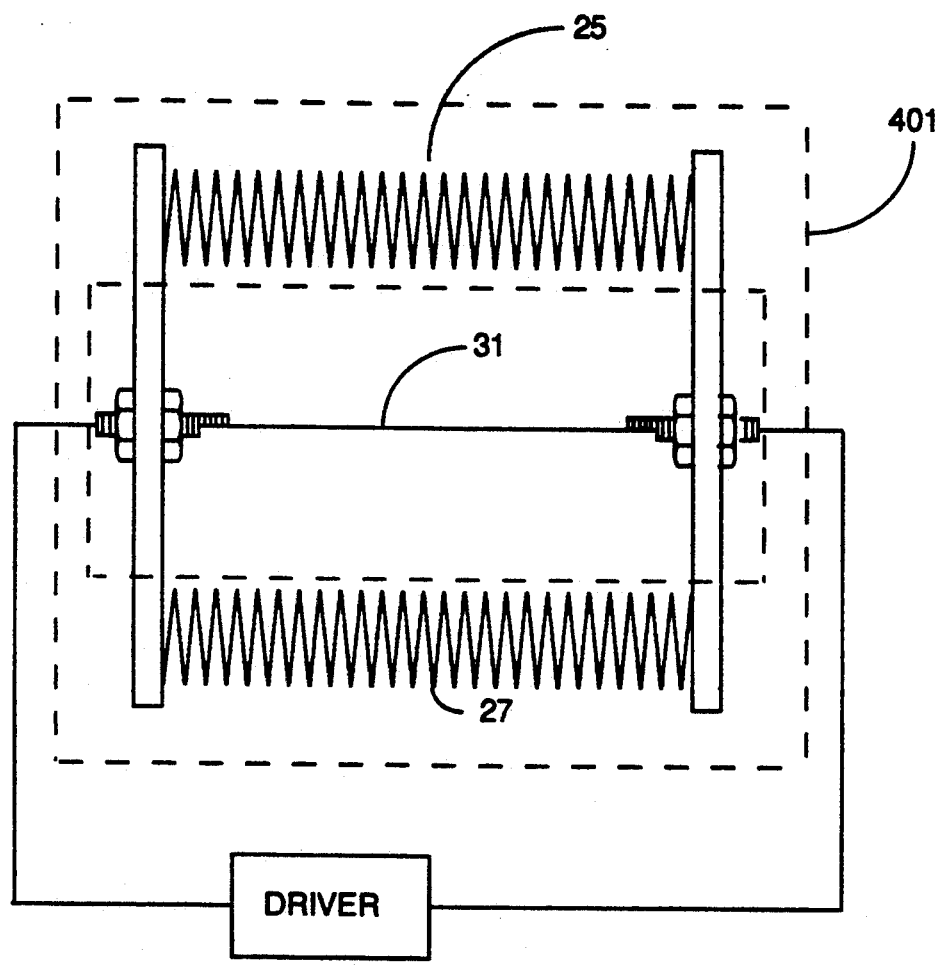
FIG. 10 is a schematic representation of a translation system according to a preferred embodiment of the invention.

The simplicity of the ThermX translator can be appreciated by considering the schematic representation shown in FIG. 10. Conceptually, the ThermX translator needs to include only a thermally expansible element, such as wire 31, a tensioning system 401 (in this FIGURE springs 25 and 27) for keeping the thermally expansible element taut, and a driver for heating and/or permitting the cooling of the thermally expansible element. Although an active cooling system rather than a heating system could be used for controlling the expansion and contraction of the wire, such an approach is not as convenient for the particular application of moving the etalon of a lateral shearing plate interferometer. Also, with regard to the preferred implementation for the lateral dynamic shearing interferometer using two flexure hinges, those skilled in the art will appreciate that conceptually it would be possible to use only one flexure hinge, placed for example on the edge of ring structure 15 opposite (i.e. across the diameter from) the ThermX wire. Such an arrangement would, however, require twice the displacement of the preferred two-hinge, centered, configuration. Furthermore, even with the limited wire elongation required with the two-hinge configuration, the desired elongation is not easily achieved. In particular, to obtain a desired elongation of 0.005 mm to 0.010 mm, requires a wire with a substantial coefficient of thermal expansion in order to avoid adverse thermal effects on the etalon caused by high wire temperatures. These particular needs were met in the preferred embodiment using a resistance wire MWS alloy 675, 36 AWG (0.005 inches diameter), having a resistivity of 27 Ohms/linear foot, and a linear expansion coefficient of 17 parts/million/degree C. This wire can be obtained from MWS Wire Industries in West Lake Village, Colo. Other wires could also be used of course, depending on the temperature characteristics desired.

Those skilled in the art will appreciate that other implementations of the ThermX translator that require different translation distances and that have different thermal stability requirements might well be met by other standard materials and wire dimensions.

Figure 6:
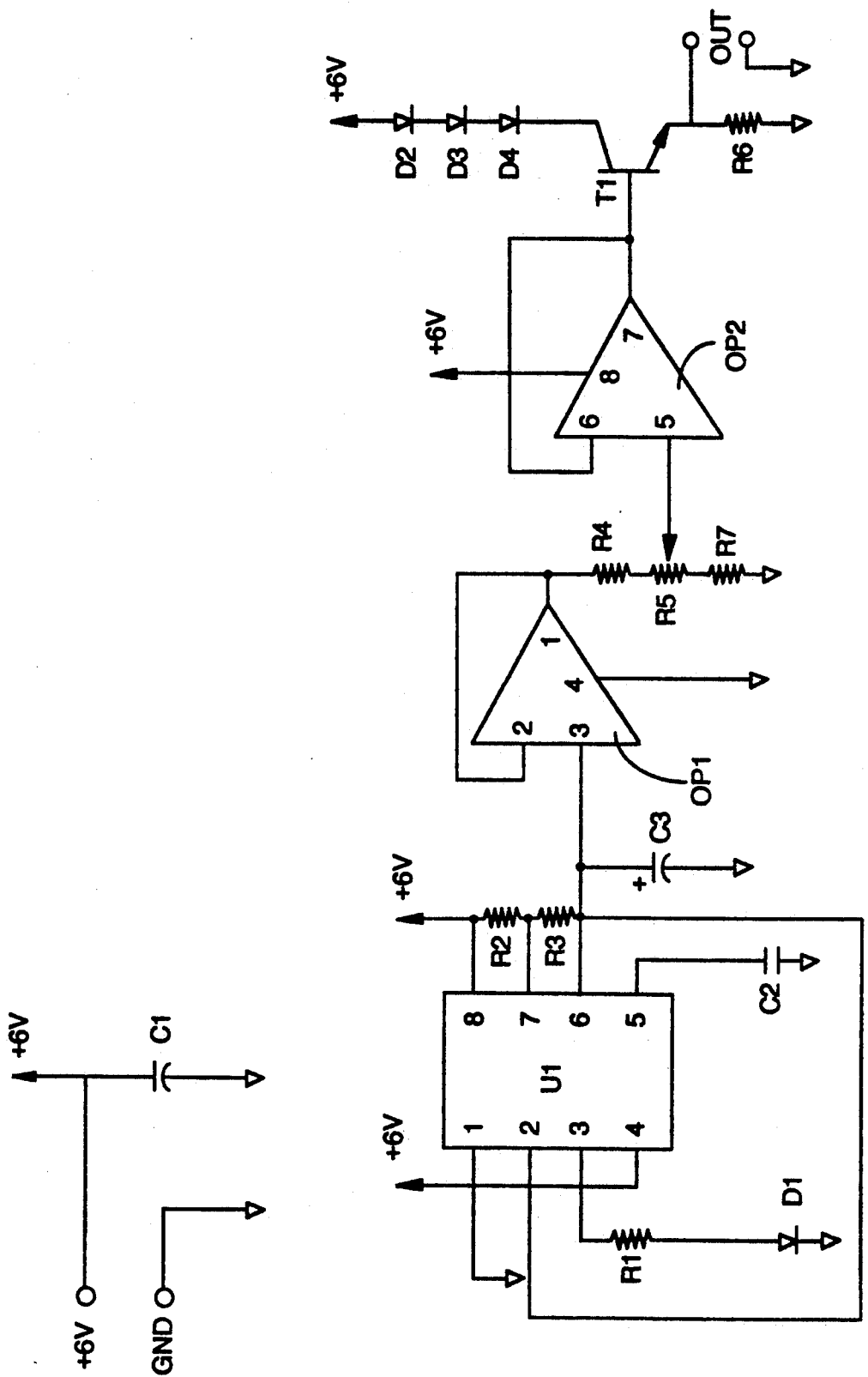
FIG. 6 is a schematic of a driver for power and control of a translator according to a preferred embodiment for the interferometer of FIGS. 3 and 4.

The ThermX translator driver used in the preferred embodiment is shown schematically in FIG. 6. It includes active circuit elements U1, which is an NE555 timer, operational amplifiers OP1 and OP2, which are each one-half of an LM358 integrated circuit package, and a power transistor T1, typically an MJE200. Pin 3 of U1 provides a square wave with a period determined by the time constant of resistors R2 and R3 and capacitor C1. The square wave output signal is received by light emitting diode D1, which is used to provide a visual indication of when a scan of the etalon is to be initiated. The resistor R1 is used to buffer D1. Capacitor C3 provides a triangle wave, as it charges and discharges. The charging and discharging of C3 is controlled by pins 8 and 7 of U1, with the time constant being determined by resistors R2 and R3 and capacitor C3. The output signal from C3 is received at pin 3 of OP1, which is configured as a buffer amplifier. Hence, OP1 has a high input impedance and can monitor the voltage on C3 without disturbing the frequency of the oscillator. The output signal on pin 1 of OP1 is routed to a voltage divider made up of resistors R4, and R7, and potentiometer R5. The voltage divider drops the voltage of the ramp from C3 from its nominal range of 2 to 4 volts to about 1 to 2 volts. The potentiometer R5 provides the operator with control over the voltage drop in order to vary the input voltage to pin 5 of OP2, which is also configured as a buffer amplifier so as not to disturb the output of the voltage divider. The output signal on pin 7 of OP2 is used to drive power transistor T1, which is in emitter-follower configuration. Thus T1 provides the high current needed to drive the wire heating and follows the trigger signaled by LED D1. The control of the voltage across the wire is accomplished by potentiometer R5. Three diodes D2, D3, and D4 (each a 1N4002) are used to provide the required voltage drop independent of the current through the transistor. Resistor R6 is a dummy load for when the system is not connected.

For a given laser beam diameter, the number of fringes traversed in each scan of the COLLIMETER varies monotonically with the amplitude of the voltage ramp across the ThermX wire. Hence, the number of fringes scanned is very directly related to the wiper position of potentiometer R5. The larger the voltage ramp on pin 5 of OP2, the greater the number of fringes that are traversed. This capability of being able to vary the amplitude of the voltage ramp across the ThermX wire, and hence the change in the amount of rotation of the shearing plate during a scan, is also extremely useful in accommodating different laser beam diameters and wavelengths, and is particularly useful for beams of small diameter (on the order of a few millimeters) and/or lasers of longer wavelength (e.g. on the order of a micron).

The following table provides the specifications of the balance of the components not already described with reference to FIG. 6:

| R1 | 330 | Ohms |
| R2 | 1K | Ohms |
| R3 | 1M | Ohms |
| R4 | 10K | Ohms |
| R5 | 5K | Ohms |
| R6 | 1K | Ohms |
| R7 | 5K | Ohms |
| C1 | 22 | uf, 15 V |
| C2 | 0.01 | uf |
| C3 | 10 | uf, 10V, TANT |
| C4 | 0.01 | uf |
| C5 | 0.01 | uf |

Figure 11:
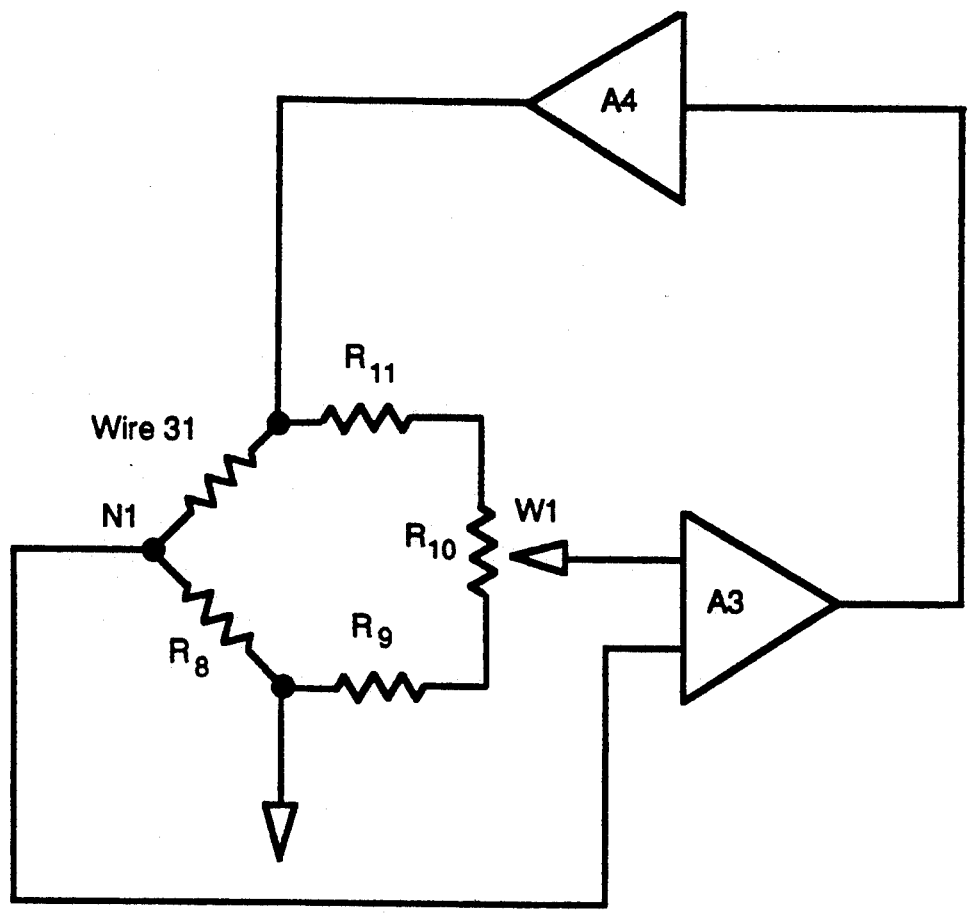
FIG. 11 is a schematic of a driver for power and control of a translator according to an alternative preferred embodiment of the invention.

Those skilled in the art will appreciate that other applications of the ThermX translator will likely use other drive electronics. For example, FIG. 11 shows a non-oscillatory embodiment of the ThermX drive that can provide precision translation, such as might be used for a cartesian stage. In that application, it is desirable to measure the temperature of the wire during the heating process in order to obtain precise control over changes in the wire length. In that embodiment, it is desirable to have a wire that exhibits a large rate of change in resistance with change in temperature. Such a wire is available from Fine Wire Company in Grover City California. For example, their CFW-656 wire, a Nickel/Chromium alloy, Stablohm 610, has a thermal expansion coefficient of 15.6 parts/million/degree C and a temperature coefficient of resistance of 400 parts/million/degree C. Standard bridge measurement techniques as illustrated in FIG. 11 can be used to accurately measure the change in resistance and hence enable one to determine the change in length as the wire is heated. In this embodiment, wire 31 forms one arm of the bridge circuit, with the balance of the bridge being made up of resistors R8, R9, R11, and potentiometer R10. The voltage between wiper W1 of potentiometer R10 and the node N1 provides the input signal to a differential amplifier A3. The output signal from A3 forms the input signal to power amplifier A4, and the output signal of A4 provides the power to drive ThermX wire 31. Once the system is calibrated, wiper W1 essentially provides a length control for the ThermX wire. In a typical implementation, R8 is a low temperature coefficient Nichrome wire and is chosen to have approximately the same resistance as the ThermX wire 31. Resistors R8 and R11 are chosen to be approximately equal, and are generally precision resistors with low temperature coefficients as well. The resistors are chosen such that $Rt/R8 = R11/R9$, where Rt is the resistance of the ThermX wire, and R8, R9, and R11 represent the resistances of their respective resistors. Generally, R11 and R9 are both much larger than either Rt or R8.

Those skilled in the art will appreciate that other implementations of the ThermX translator that require different translation distances and that have different thermal stability requirements might well be met by other standard materials and wire dimensions.

Those skilled in the art will also appreciate that there are many changes and modifications that may be made to the embodiments described above without departing from the spirit and scope of the invention. For example, the size and material of the etalon can vary widely, the mechanical construction of the base and ring structures may change, and many dimensions can vary. There are many ways that a power and control circuit may be designed to accomplish the purposes of the circuitry of the preferred embodiment for the ThermX drive. In the pendulum embodiment, the dimensions and materials can vary to produce a different pendulum period and the period of both the pendulum embodiment and the ThermX-driven embodiment can vary widely. In an alternative embodiment of the COLLIMETER, the shearing plate may be pivoted to the support and a drive provided to oscillate the shearing plate. There are many different ways the shearing plate may be pivoted in the support, and the drive can similarly take many forms to oscillate the plate satisfactorily. For example, a workable drive could incorporate an electric motor and a driven cam engaging a follower on a housing for the shearing plate. Therefore, the appended claims are intended to cover all such modifications, changes, and applications that fall within the spirit and scope of the invention.

What is claimed is:

1. A dynamic shearing plate interferometer comprising:
    a shearing plate with substantially parallel faces, said shearing plate constructed of a transparent material;
    mounting means for supporting said shearing plate; and
    movement means for rotating said shearing plate about an axis parallel to said faces, wherein said rotation of said shearing plate is oscillatory.

2. An interferometer as in claim 1 further comprising movements electrically activated indicator means for providing a physical indication of the direction of rotation of said shearing plate.

3. An interferometer as in claim 1 wherein said movement means comprises:
    pivot means for pivoting said shearing plate in said mounting means such that said shearing plate may oscillate about said axis;
    drive means for forceably oscillating said shearing plate about said axis.

4. An interferometer as in claim 3 wherein said pivot means comprises a cylindrical mounting ring, said mounting ring separated in two places along a plane substantially parallel to the ends of said mounting ring leaving two flexure hinges located substantially on a diameter of said plane such that said cylindrical mounting ring is separated into a first cylindrical portion and a second cylindrical portion connected by said flexure hinges;
    said shearing plate being securely mounted in said first cylindrical portion and said second cylindrical portion being fixedly attached to said mounting means;
    and wherein said drive means comprises:
    a wire affixed to said first and said second portions of said cylindrical mounting ring and tensioned to deform said flexure hinges such that said first cylindrical portion is rotated relative to said second cylindrical portion; and
    electrical power and control means for periodically heating said wire such that said first cylindrical portion is caused to oscillate relative to said second cylindrical portion.

5. An interferometer as in claim 1 wherein said movement means comprises a suspension means for said shearing plate, said suspension means coupled to said mounting means, for using gravity as a restoring force to oscillate said shearing plate in a pendulous manner about said axis.

6. An interferometer as in claim 5 wherein:
    said suspension means comprises an inner ring attached to said shearing plate;
    said mounting means comprises an outer ring; and
    said inner ring is pivoted on said axis in said outer ring.

7. A method of collimating a substantially coherent light beam comprising:
    placing a transparent shearing plate with substantially parallel faces in said light beam at an angle to the beam such that reflections from the front and back surfaces of said shearing plate form an interference fringe pattern on an intercepting surface;
    oscillating the shearing plate such that the fringes comprising the interference pattern translate on said intercepting surface; and
    adjusting the collimation of said light beam until said translating fringes appear to become a temporally alternating light and dark region on said surface.

8. An interferometer comprising:
    a shearing plate with substantially parallel faces, said shearing plate constructed of a transparent material; and
    movement means coupled to said shearing plate for oscillating the orientation of said shearing plate about an axis parallel to said faces.

9. An interferometer as in claim 8
    wherein said movement means comprises pivot means for rotating said shearing plate back and forth about said axis to cause said oscillation of said orientation.

10. An interferometer as in claim 9 wherein said movement means comprises drive means coupled to said shearing plate for providing an oscillating force to drive said rotation of said shearing plate.

11. An interferometer as in claim 9 wherein said movement means comprises a stationary portion and a mounting means for mounting said shearing plate thereto, said mounting means and said stationary portion attached to each other by means of said pivot means, said shearing plate being fixedly mounted in said mounting means; and
    wherein said movement means further comprises drive means coupled to said stationary portion and to said mounting means for forceably causing an oscillatory rotation between said stationary portion and said mounting means, said oscillatory rotation having an axis of rotation through said pivot means so as to oscillate the orientation of said shearing plate relative to said stationary portion.

12. An interferometer as in claim 11 wherein said pivot means comprises a flexure hinge for causing a restoring force between said stationary portion and said mounting means and
    wherein said drive means comprises a wire affixed to said stationary portion and to said mounting means, said wire tensioned to deform said flexure hinges such that said mounting means is rotated relative to said stationary portion; and
    electrical power and control means for periodically heating said wire such that said mounting means is caused to oscillate relative to said stationary portion.

13. An interferometer as in claim 8 further comprising:
    negative lens means for expanding light beams reflected from said parallel faces of said shearing plate;
    lens mounting means coupled to said mounting means for holding said negative lens means so that light beams reflected from said shearing plate will pass through said negative lens means.

14. A method of collimating a substantially coherent light beam comprising:
    placing a transparent shearing plate with substantially parallel faces in said light beam at an angle to the beam such that reflections from the front and back surfaces of said shearing plate have an axial delay thereby forming an interference fringe pattern on an intercepting surface;

oscillating the axial delay such that fringes in said interference fringe pattern translate back and forth on said intercepting surface; and adjusting the collimation of said light beam until said fringes no longer appear to translate, but become instead a stationary alternating light and dark region on said intercepting surface.

15. A dynamic shearing plate interferometer comprising:

a shearing plate with substantially parallel faces, said shearing plate constructed of a transparent material;

mounting means for supporting said shearing plate; and movement means for rotating said shearing plate about an axis parallel to said faces;

negative lens means for expanding light beams reflected from said parallel faces of said shearing plate;

lens mounting means coupled to said mounting means for holding said negative lens means so that light beams reflected from said shearing plate will pass through said negative lens means.

* * * * *